Feb. 5, 1946.　　　A. FISHER　　　2,394,049
DYNAMO-ELECTRIC MACHINE
Filed Dec. 18, 1941
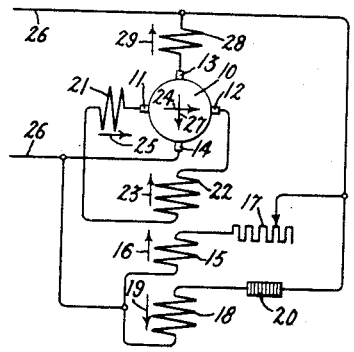
Inventor:
Alec Fisher,
by Harry E. Duncan
His Attorney.

Patented Feb. 5, 1946

2,394,049

UNITED STATES PATENT OFFICE 2,394,049

DYNAMOELECTRIC MACHINE

Alec Fisher, Lynn, Mass., assignor to General Electric Company, a corporation of New York Application December 18, 1941, Serial No. 423,481

14 Claims. (Cl. 171—223)

My invention relates to dynamo-electric machines and particularly to substantially constant voltage machines of the armature reaction excited type.

An object of my invention is to provide an improved armature reaction excited dynamo-electric machine having a substantially constant voltage characteristic.

Further objects and advantages of my invention will become apparent and my invention will be better understood from the following description referring to the accompanying drawing, and the features of novelty which characterize my invention will be pointed out with particularity in the claims annexed to and forming part of this specification.

The drawing schematically illustrates an armature reaction excited dynamo-electric machine embodying my invention.

Referring to the drawing, I have shown a dynamo-electric machine adapted to operate as a generator and provided with an armature or rotatable member 10 adapted to be driven by any suitable source of mechanical power. The armature 10 is of the conventional direct current type having a winding connected to a commutator and is provided with a set of primary brushes 11 and 12 and a set of secondary brushes 13 and 14 displaced about the commutator from the primary brushes for providing a primary circuit and a secondary circuit respectively through the armature winding. The stationary member of the machine is provided with a field exciting winding 15 arranged to provide a component of magnetic excitation along the secondary commutating axis of the machine, as indicated by the arrow 16. This field exciting winding may be connected across any suitable source of electrical power supply and in the arrangement illustrated is connected across the secondary circuit of the machine to provide a component of excitation responsive to the voltage across the secondary brushes 13 and 14. A variable resistor 17 is connected in series with the field exciting winding 15 for controlling the excitation provided by this winding. A second field exciting winding 18 is also arranged along the secondary commutating axis of the machine and is arranged to provide a component of excitation thereto in opposition to the excitation provided by the field exciting winding 15, as indicated by the arrow 19. This field exciting winding 18 also is connected across the secondary of the machine such that its energization will be responsive to the voltage of the secondary brushes. The energization of this field exciting winding is adapted to be varied automatically by a regulating device including a negative voltage-resistance characteristic element 20 such as a Thyrite resistor for inherently varying the resistance of the circuit inversely relative to its energizing voltage. Such resistors have the characteristic of decreasing their resistance with an increase in voltage or increasing their resistance with a decrease in voltage, thereby augmenting the effect of a variation in the voltage. Thus, if the component of excitation provided by the field exciting winding 15 is greater than the component of excitation furnished by the field exciting winding 18, the difference between these two excitations will tend to maintain inherently the voltage of the machine substantially constant irrespective of speed variations, as a drop in voltage across the secondary of the machine will result in a decreased excitation by both windings, but the decrease of the excitation provided by the field exciting winding 18 will be less than the decrease in the excitation provided by the field exciting winding 15, such that the difference between these two excitations will be greater than it was prior to the decrease in the secondary voltage. This will produce a net increase in the excitation of the machine and thereby tend to maintain substantially constant the voltage of the machine.

The primary brushes 11 and 12 are substantially short circuited through two field exciting windings 21 and 22 arranged along the primary commutating axis and the secondary commutating axis, respectively, of the machine. These windings are adapted to be energized by the primary current of the machine and thereby provide components of excitation responsive to the current in the primary circuit of the armature winding. The field exciting winding 22 is arranged to provide a component of excitation which is in the same direction as the difference between the two components of excitation provided by the field exciting windings 15 and 18, that is, in the same direction as the excitation provided by the field exciting winding 15, as indicated by the arrow 23. The field exciting winding 21 is adapted to provide a component of excitation responsive to the primary current of the armature winding and in substantially the same direction as the primary armature reaction 24 of the machine, as indicated by the arrow 25. This quadrature component of excitation 25 provided by the field exciting winding 21 increases the excitation along the primary commutating axis and thereby reduces the amount of primary current required to produce a desired magnetic excitation along this commutating axis and, therefore, tends to reduce the primary current and the consequent heating of the armature winding. If a load is connected across the secondary terminals 26 of the machine, a secondary current will flow through the armature winding, producing a secondary armature reaction, as indicated by the arrow 27, opposed to the net or differential component of excitation produced by the field exciting windings 15 and 18. This would normally require a larger component of excitation in order to maintain the desired secondary voltage, as the control excitation would have to provide the original excitation and, in addition, a component of excitation equal and opposite to the secondary current armature reaction 27. The sensitivity of the machine and the inherent regulation thereof is increased by providing a compensating field exciting winding 28 arranged along the secondary commutating axis of the machine and adapted to provide a component of excitation thereto responsive to the secondary current in the armature winding in opposition to the secondary armature reaction 27, as indicated by the arrow 29. This component 29 should be made substantially equal and opposite to the secondary armature reaction 27, or even slightly greater than this secondary armature reaction, such that the difference between the two will either amount to nothing or provide a slight cumulative excitation to the machine which will compensate for any voltage drop which might result from the flow of the secondary current through the armature winding.

The operation of this machine is such that the residual magnetism of the machine will tend to induce a voltage between the secondary brushes 13 and 14 which will energize the field exciting windings 15 and 18, and the differential excitation provided by these two field exciting windings will induce a voltage in the armature winding primary circuit between the primary brushes 11 and 12. This primary voltage will cause an energizing current to flow through the field exciting windings 21 and 22, thereby producing a primary armature reaction 24 and a component of excitation 25 along the primary axis. This primary axis excitation will induce a voltage between the secondary brushes 13 and 14 which, in turn, will increase the energization of the field exciting windings 15 and 18. The primary current through the field exciting winding 22 will provide an excitation along the secondary commutating axis of the machine which will inherently tend to maintain a substantially constant secondary voltage irrespective of the speed of the machine, as any variation in the speed of the machine will require an inverse variation in the excitation provided by this winding, such that the sum of the excitation of this winding and the differential excitation of the field exciting windings 15 and 18 will vary in inverse relationship relative to the change in the speed of the machine, thereby maintaining substantially constant the secondary voltage of the machine. With the proper compensating excitation provided by the field exciting winding 28, this machine will, therefore, maintain substantially constant voltage over wide variations of speed and load.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent in the United States is:

1. A dynamo-electric machine having a rotatable member with a winding and a commutator connected thereto, a set of primary brushes and a set of secondary brushes displaced about said commutator from said primary brushes for providing a primary circuit and a secondary circuit respectively through said rotatable member winding, a field exciting winding arranged to provide a component of excitation along the secondary commutating axis of said machine, means for energizing said field exciting winding, a second field exciting winding arranged to provide a component of excitation along the secondary commutating axis of said machine in opposition to the excitation of said first-mentioned field exciting winding, means for energizing said second field exciting winding, means for varying the resistance of said second field exciting winding circuit inversely relative to changes in the energizing voltage for maintaining the secondary voltage of said machine substantially constant, and a third field exciting winding arranged to provide a component of excitation along the secondary commutating axis of said machine in opposition to the secondary armature reaction of said machine.

2. A dynamo-electric machine having a rotatable member with a winding and a commutator connected thereto, a set of primary brushes and a set of secondary brushes displaced about said commutator from said primary brushes for providing a primary circuit and a secondary circuit respectively through said rotatable member winding, a field exciting winding arranged to provide a component of excitation along the secondary commutating axis of said machine, means for energizing said field exciting winding by voltage of said secondary brushes, a second field exciting winding arranged to provide a component of excitation along the secondary commutating axis of said machine in opposition to the excitation of said first-mentioned field exciting winding, means for energizing said second field exciting winding by voltage of said secondary brushes, means for varying the resistance of said second field exciting winding circuit inversely relative to changes in the energizing voltage for maintaining the secondary voltage of said machine substantially constant, means including a third field exciting winding arranged to provide a component of excitation along the secondary commutating axis of said machine in opposition to the secondary armature reaction of said machine, and means for energizing said third field exciting winding responsive to current in said secondary circuit of said rotatable member winding.

3. A dynamo-electric machine having a rotatable member with a winding and a commutator connected thereto, a set of primary brushes and a set of secondary brushes displaced about said commutator from said primary brushes for providing a primary circuit and a secondary circuit respectively through said rotatable member winding, a field exciting winding arranged to provide a component of excitation along the secondary commutating axis of said machine, means for energizing said field exciting winding, means for controlling the energization of said field exciting winding, a second field exciting winding arranged to provde a component of excitation along the secondary commutating axis of said machine in opposition to the excitation of said first-mentioned field exciting winding, means for energizing said second field exciting winding, a negative voltage-resistance characteristic regulating means in circuit with said second field exciting winding for maintaining the secondary voltage of said machine substantially constant, means including a third field exciting winding arranged to provide a component of excitation along the secondary commutating axis of said machine in opposition to said secondary armature reaction of said machine, and means for energizing said third field exciting winding responsive to current in said secondary circuit of said rotatable member winding to provide a component of excitation substantially equal and opposite to the secondary armature reaction of said machine.

4. A dynamo-electric machine having a rotatable member with a winding and a commutator connected thereto, a set of primary brushes and a set of secondary brushes displaced about said commutator from said primary brushes for providing a primary circuit and a secondary circuit respectively through said rotatable member winding, a field exciting winding arranged to provide a component of excitation along the secondary commutating axis of said machine, means for energizing said field exciting winding by voltage of said secondary brushes, a second field exciting winding arranged to provide a component of excitation along the secondary commutating axis of said machine in opposition to the excitation of said first-mentioned field exciting winding, means for energizing said second field exciting winding by voltage of said secondary bruhses, a negative voltage-resistance characteristic regulating means in circuit with said second field exciting winding for maintaining the secondary voltage of said machine substantially constant, and a third field exciting winding arranged to provide a component of excitation along the secondary commutating axis of said machine in opposition to the secondary armature reaction of said machine.

5. A dynamo-electric machine having a rotatable member with a winding and a commutator connected thereto, a set of primary brushes and a set of secondary brushes displaced about said commutator from said primary brushes for providing a primary circuit and a secondary circuit respectively through said rotatable member winding, a field exciting winding arranged to provide a component of excitation along the secondary commutating axis of said machine, means for energizing said field exciting winding by voltage of said secondary brushes, a second field exciting winding arranged to provide a component of excitation along the secondary commutating axis of said machine in opposition to the excitation of said first-mentioned field exciting winding, means for energizing said second field exciting winding by voltage of said brushes, a negative voltage-resistance characteristic regulating means in circuit with said second field exciting winding for maintaining the secondary voltage of said machine substantially constant, a third field exciting winding arranged to provide a component of excitation along the secondary commutating axis of said machine, and means for energizing said third field exciting winding responsive to the primary current of said machine.

6. A dynamo-electric machine having a rotatable member with a winding and a commutator connected thereto, a set of primary brushes and a set of secondary brushes displaced about said commutator from said primary brushes for providing a primary circuit and a secondary circuit respectively through said rotatable member winding, a field exciting winding arranged to provide a component of excitation along the secondary commutating axis of said machine, means for energizing said field exciting winding by voltage of said secondary brushes, a second field exciting winding arranged to provide a component of excitation along the secondary commutating axis of said machine in opposition to the excitation of said first-mentioned field exciting winding, means for energizing said second field exciting winding by voltage of said brushes, a negative voltage-resistance characteristic regulating means in circuit with said second field exciting winding for maintaining the secondary voltage of said machine substantially constant, a third field exciting winding arranged to provide a component of excitation along the secondary commutating axis of said machine in the same direction as said first field exciting winding, and means for energizing said third field exciting winding responsive to the primary current of said machine.

7. A dynamo-electric machine having a rotatable member with a winding and a commutator connected thereto, a set of primary brushes and a set of secondary brushes displaced about said commutator from said primary brushes for providing a primary circuit and a secondary circuit respectively through said rotatable member winding, a field exciting winding arranged to provide a component of excitation along the secondary commutating axis of said machine, means for energizing said field exciting winding responsive to the voltage of said secondary brushes, means for controlling the energization of said field exciting winding, a second field exciting winding arranged to provide a component of excitation along the secondary commutating axis of said machine in opposition to the excitation of said first-mentioned field exciting winding, means for energizing said second field exciting winding responsive to the voltage of said secondary brushes, a negative voltage-resistance characteristic regulating means in circuit with said second field exciting winding for maintaining the secondary voltage of said machine substantially constant, a third field exciting winding arranged to provide a component of excitation along the secondary commutating axis of said machine, and means for energizing said third field exciting winding responsive to the primary current of said machine.

8. A dynamo-electric machine having a rotatable member with a winding and a commutator connected thereto, a set of primary brushes and a set of secondary brushes displaced about said commutator from said primary brushes for providing a primary circuit and a secondary circuit respectively through said rotatable member winding, a field exciting winding arranged to provide a component of excitation along the secondary commutating axis of said machine, means for energizing said field exciting winding, a second field exciting winding arranged to provide a component of excitation along the secondary commutating axis of said machine in opposition to the excitation of said first-mentioned field exciting winding, means for energizing said second field exciting winding, means for varying the resistance of said second field exciting winding circuit inversely relative to changes in its energizing voltage for maintaining the secondary voltage of said machine substantially constant, a third field exciting winding arranged to provide a component of excitation along the secondary commutating axis of said machine in the same direction as the difference between the components of excitation provided by said first and second field exciting windings, and means for energizing said third field exciting winding by the primary current of said machine.

9. A dynamo-electric machine having a rotatable member with a winding and a commutator connected thereto, a set of primary brushes and a set of secondary brushes displaced about said commutator from said primary brushes for providing a primary circuit and a secondary circuit respectively through said rotatable member winding, a field exciting winding arranged to provide a component of excitation along the secondary commutating axis of said machine, means for energizing said field exciting winding by voltage of said secondary brushes, a second field exciting winding arranged to provide a component of excitation along the secondary commutating axis of said machine in opposition to the excitation of said first-mentioned field exciting winding, means for energizing said second field exciting winding by voltage of said secondary brushes, a negative voltage-resistance characteristic regulating means in circuit with said second field exciting winding for maintaining the secondary voltage of said machine substantially constant, a third field exciting winding arranged to provide a component of excitation along the secondary commutating axis of said machine in the same direction as the difference between the components of excitation provided by said first and second field exciting windings, and means for energizing said third field exciting winding by the primary current of said machine.

10. A dynamo-electric machine having a rotatable member with a winding and a commutator connected thereto, a set of primary brushes and a set of secondary brushes displaced about said commutator from said primary brushes for providing a primary circuit and a secondary circuit respectively through said rotatable member winding, a field exciting winding arranged to provide a component of excitation along the secondary commutating axis of said machine, means for energizing said field exciting winding responsive to the voltage of said secondary brushes, means for controlling the energization of said field exciting winding, a second field exciting winding arranged to provide a component of excitation along the secondary commutating axis of said machine in opposition to the excitation of said first-mentioned field exciting winding, means for energizing said second field exciting winding responsive to the voltage of said secondary brushes, a negative voltage-resistance characteristic regulating means in circuit with said second field exciting winding for maintaining the secondary voltage of said machine substantially constant, a third field exciting winding arranged to provide a component of excitation along the secondary commutating axis of said machine in the same direction as the difference between the components of excitation provided by said first and second field exciting windings, and means for energizing said third field exciting winding responsive to the primary current of said machine.

11. A dynamo-electric machine having a rotatable member with a winding and a commutator connected thereto, a set of primary brushes and a set of secondary brushes displaced about said commutator from said primary brushes for providing a primary circuit and a secondary circuit respectively through said rotatable member winding, a field exciting winding arranged to provide a component of excitation along the secondary commutating axis of said machine, means for energizing said field exciting winding responsive to the voltage of said secondary brushes, means for controlling the energization of said field exciting winding arranged to provide a component of excitation along the secondary commutating axis of said machine in opposition to the excitation of said first-mentioned field exciting winding, means for energizing said second field exciting winding responsive to the voltage of said secondary brushes, a negative voltage-resistance characteristic regulating means in circuit with said second field exciting winding for inherently maintaining the secondary voltage of said machine substantially constant, a third field exciting winding arranged to provide a component of excitation along the secondary commutating axis of said machine in same direction as the difference between the components of excitation provided by said first and second field exciting windings, means for energizing said third field exciting winding responsive to primary current in said machine, a fourth field exciting winding arranged to provide a component of excitation along the primary commutating axis of said machine responsive to the primary current of said machine, and a fifth field exciting winding arranged to provide a component of excitation along the secondary commutating axis of said machine in opposition to the secondary armature reaction of said machine.

12. A dynamo-electric machine having a rotatable member with a winding and a commutator connected thereto, a set of primary brushes and a set of secondary brushes displaced about said commutator from said primary brushes for providing a primary circuit and a secondary circuit respectively through said rotatable member winding, a field exciting winding arranged to provide a component of excitation along the secondary commutating axis of said machine, means for energizing said field exciting winding responsive to the voltage of said secondary brushes, means for controlling the energization of said field exciting winding, a second field exciting winding arranged to provide a component of excitation along the secondary commutating axis of said machine in opposition to the excitation of said first-mentioned field exciting winding, means for energizing said second field exciting winding responsive to the voltage of said secondary brushes, a negative voltage-resistance characteristic regulating means in circuit with said second field exciting winding for maintaining the secondary voltage of said machine substantially constant, a third field exciting winding arranged to provide a component of excitation along the secondary commutating axis of said machine in the same direction as the difference between the components of excitation provided by said first and second field exciting windings, means for energizing said third field exciting winding responsive to the primary current of said machine, and a fourth field exciting winding arranged to provide a component of excitation along the primary commutating axis of said machine responsive to the primary current of said machine and in the same direction as the primary armature reaction, and means including a fifth field exciting winding arranged to provide a component of excitation along the secondary commutating axis of said machine in opposition to the secondary armature reaction of said machine.

14. A dynamo-electric machine having a rotatable member with a winding and a comutator connected thereto, a set of primary brushes and a set of secondary brushes displaced about said commutator from said primary brushes for providing a primary circuit and a secondary circuit respectively through said rotatable member winding, a field exciting winding arranged to provide a component of excitation along the secondary commutating axis of said machine, means for energizing said field exciting winding responsive to the voltage of said secondary brushes, means for controlling the energization of said field exciting winding, a second field exciting winding arranged to provide a component of excitation along the secondary commutating axis of said machine in opposition to the excitation of said first-mentioned field exciting winding, means for energizing said second field exciting winding responsive to the voltage of said secondary brushes, a negative voltage-resistance characteristic regulating means in circuit with said second field exciting winding for inherently maintaining the secondary voltage of said machine substantially constant, a third field exciting winding arranged to provide a component of excitation along the secondary commutating axis of said machine, means for energizing said third field exciting winding responsive to the primary current of said machine, a fourth field exciting winding arranged along the primary commutating axis of said machine responsive to the primary current of said machine and in the same direction as the primary armature reaction of said machine, means including a fifth field exciting winding arranged to provide a component of excitation along the secondary commutating axis of said machine in opposition to the secondary armature reaction of said machine, and means for energizing said fifth field exciting winding responsive to current in said secondary circuit of said rotatable member winding.

14. A dynamo-electric machine having a rotatable member with a winding and a commutator connected thereto, a set of primary brushes and a set of secondary brushes displaced about said commutator from said primary brushes for providing a primary circuit and a secondary circuit respectively through said rotatable member winding, a field exciting winding arranged to provide a component of excitation along the secondary commutating axis of said machine, means for energizing said field exciting winding responsive to the voltage of said secondary brushes, means for controlling the energization of said field exciting winding, a second field exciting winding arranged to provide a component of excitation along the secondary commutating axis of said machine in opposition to the excitation of said first-mentioned field exciting winding, means for energizing said second field exciting winding responsive to the voltage of said secondary brushes, a negative voltage-resistance characteristic regulating means in circuit with said second field exciting winding for maintaining the secondary voltage of said machine substantially constant, a third field exciting winding arranged to provide a component of excitation along the secondary commutating axis of said machine in the same direction as the difference between the components of excitation provided by said first and second field exciting windings, means for energizing said third field exciting winding responsive to the primary current of said machine, a fourth field exciting winding arranged to provide a component of excitation along the primary commutating axis of said machine responsive to the primary current of said machine and in the same direction as the primary armature reaction, means including a fifth field exciting winding arranged to provide a component of excitation along the secondary commutating axis of said machine in opposition to the secondary armature reaction of said machine, and means for energizing said fifth field exciting winding responsive to current in said secondary circuit of said rotatable member winding to provide a component of excitation substantially equal and opposite to the secondary armature reaction of said machine.

ALEC FISHER.